(12) United States Patent
Hunt

(10) Patent No.: US 6,593,530 B2
(45) Date of Patent: Jul. 15, 2003

(54) ELECTRICAL SWITCH IDENTIFICATION PLATE WITH REPLACEABLE INSERT MEMBERS

(76) Inventor: Torrence L. Hunt, 1955 N. Highland Ave., Tarpon Springs, FL (US) 34689

( * ) Notice: Subject to any disclaimer, the term of this patent is extended or adjusted under 35 U.S.C. 154(b) by 132 days.

(21) Appl. No.: 09/916,055

(22) Filed: Jul. 26, 2001

(65) Prior Publication Data

US 2003/0019732 A1 Jan. 30, 2003

(51) Int. Cl.[7] .................... H05K 5/03; G09F 7/02; H01H 9/16; H02G 3/14
(52) U.S. Cl. ................. 174/66; 40/611; 200/309; 220/241
(58) Field of Search ................ 200/308, 309, 200/310, 311; 174/66, 67; 220/241, 242; 40/611, 618, 642.02

(56) References Cited

U.S. PATENT DOCUMENTS

| | | | |
|---|---|---|---|
| 1,930,610 A | * 10/1933 | Despard | ........... 174/66 X |
| 4,004,120 A | 1/1977 | Lee | |
| 4,566,185 A | 1/1986 | Bryan | |
| 5,217,190 A | 6/1993 | Reed et al. | |
| 5,295,869 A | 3/1994 | Siemon et al. | |
| 5,613,874 A | 3/1997 | Orlando et al. | |
| 5,620,335 A | 4/1997 | Siemon | |
| 5,735,708 A | 4/1998 | Arnett et al. | |
| 5,769,653 A | 6/1998 | Osterbrock et al. | |
| 5,807,139 A | 9/1998 | Volansky et al. | |
| 5,977,481 A | * 11/1999 | Worrell et al. | ........... 174/66 |
| 6,172,301 B1 | * 1/2001 | Goodsell | ........... 174/66 |
| 6,421,941 B1 | * 7/2002 | Finke et al. | ........... 40/611 |

* cited by examiner

*Primary Examiner*—J. R. Scott
(74) *Attorney, Agent, or Firm*—Larson & Larson, PA; James E. Larson

(57) ABSTRACT

An electrical switch identification plate for mounting to a wall has an opening formed in the plate and pair of cavities disposed above and below the opening. A pair of screw holes are formed through each cavity at a center portion thereof. A pair of bores are formed in each cavity and surround each screw hole. An indicia insert member has a shape substantially the same as that of the cavities. A pair of pins are mounted on a bottom surface of each insert member and are received by the bores for retaining each insert member in each cavity. Indicia is mounted on a top surface of the insert member and operates to identify the switch and its on or off position.

20 Claims, 5 Drawing Sheets

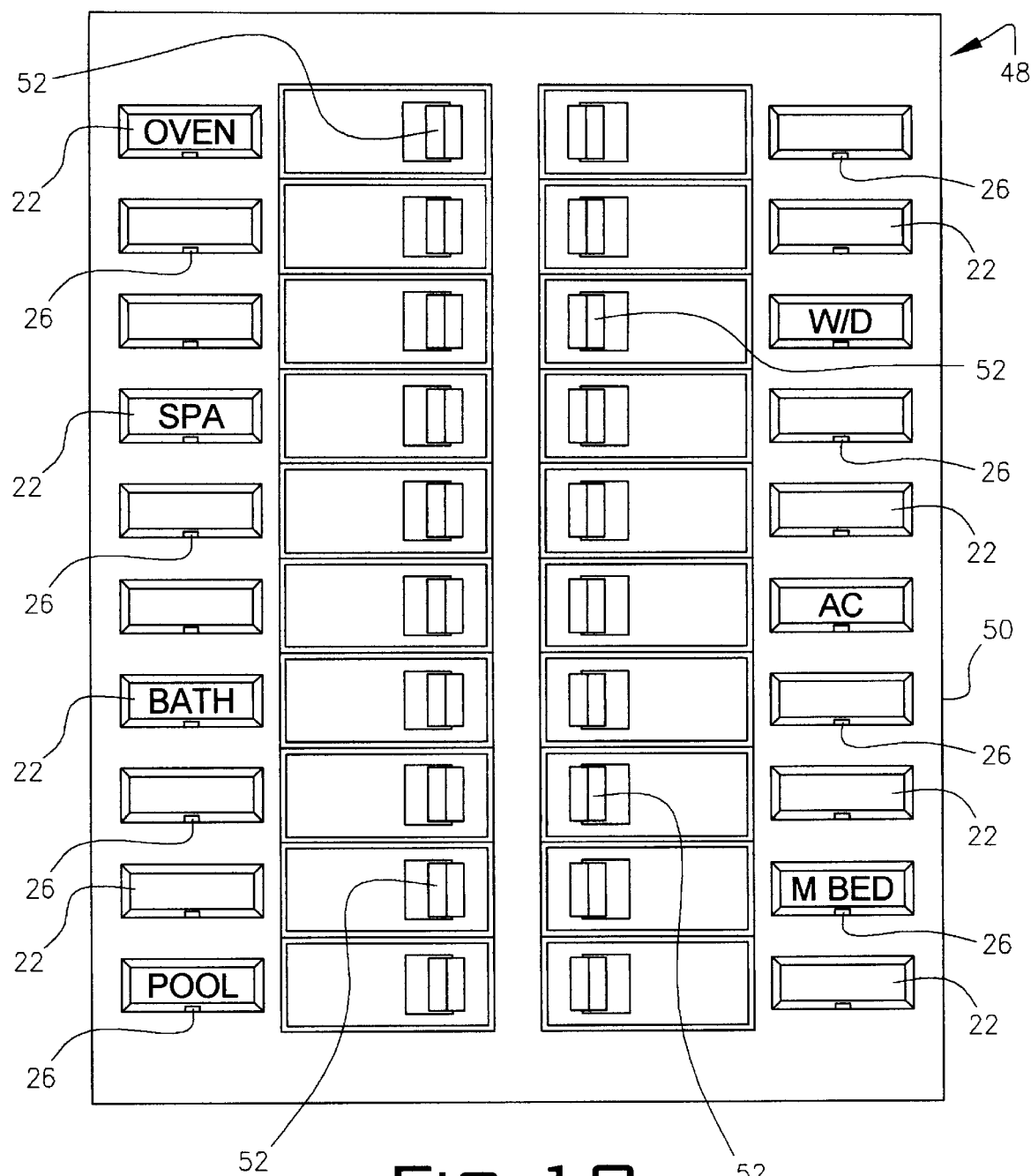
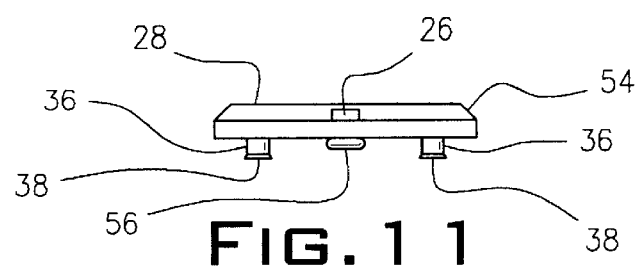
FIG. 10
FIG. 11

ELECTRICAL SWITCH IDENTIFICATION PLATE WITH REPLACEABLE INSERT MEMBERS

BACKGROUND OF THE INVENTION

1. Field of the Invention

This invention relates to electrical switch plates. More particularly, it relates to a device, in the form of a small plate, for installing around an electrical switch or breaker panel for identifying the electrical device, outlet or breaker associated therewith.

2. Description of Prior Art

In all homes and business, electrical switches and outlets are used extensively throughout the respective structure for supplying a source of AC current to the structure. Further, all employ breaker panels. Of course, it is well known that the AC current supplied to a structure is used to power a multitude of different devices and are spaced through the structure in an electrical scheme typically designed by a general contractor, electrical contractor, or architect.

In a home environment, the multitude of different devices includes, but are not limited to, lights, fans, computers, kitchen appliances and random AC outlets throughout the home. In many instances, a plurality of electrical switches are grouped together at one location to control a bevy of different devices and outlets. As stated before, this grouping is most likely designed by the architect, general contractor or electrical contractor. It is not common for someone building a new home to become integrally involved in the designing of the electrical scheme of the new home. Discretion is typically left with the expertise of the architect or contractor. However, upon completion of the home, the new home owner may wish to understand the electrical scheme, insofar as understanding which switches control which outlets and devices (i.e., lights and ceiling fans). The home owner could of course review the electrical blueprints to obtain an understanding of the electrical scheme. However, most people would find that reading such a blueprint to be difficult and essentially useless. It would therefore be useful to have a device or system which permits the home owner to identify which switches control which devices and outlets throughout their home.

The problem with not knowing which switches control which devices and outlets is exacerbated when someone buys an existing built home. The new owner does not have the architect, electrical contractor or general contractor at their disposal to explain which switches control which devices and outlets. It would therefore be extremely useful to have a device or system that identifies which switches control which devices and outlets.

Various labeling devices are well known in the prior art. Theses device typically employ a ribbon-like material which is capable of being imprinted with a word. The ribbon material is loaded on a spool located within a housing of the labeling device having a keyboard. A user types the word to be printed on the keyboard and then engages a print command which in turn ejects a piece of ribbon material having the word printed thereupon. The ribbon material usually has an adhesive backing which can be used to affix the indicia to a desired location. These labeling devices could of course be used to identify switches and outlets, but have inherent disadvantages. Most noticeable is that the adhesive will loosen over time resulting in the indicia falling from its adhered location. Further, the use of an indicia marking device does not provide an aesthetically pleasing appearance since the ribbon print-outs can vary in look and size. What is needed is a device or system which permits the identification of switches and outlets which is permanent, consistent in look as well as aesthetically pleasing to the end user.

Similar problems exist in breaker panel boxes wherein a multitude of breakers are located with little or no identification indicia. Typically, upon installation of the breaker panel, an electrical contractor will "pencil-in" a few identifiers for some of the more critical breakers, such as, for example, the clothes washer and dryer, the dishwasher, the water heater and the AC unit. However, most of the remainder of outlets and devices within the electrical scheme are disregarded. This causes a problem for a new home builder as well as a used home buyer.

In a large manufacturing facility, wherein an extensive amount of breaker panels are employed, non-marking of the breakers, or electrical switches and outlets, can cause serious problems. One can easily see that a device or system that properly identifies the breaker panel of a hospital, for example, is almost critical. Improper marking, or non-marking could be life threatening in a hospital environment. Further, in a manufacturing facility, mis-marked or non-marked breaker panels could result in cutting power to a machine which could overload and/or cause injury due to the loss of power.

A device or system for identifying switches, power outlets and breaker panel boxes is clearly needed. Such a device would be even more useful if it employed a lighting element to enhance its capabilities to identify the switch, outlet or breaker in a low light situation.

SUMMARY OF THE INVENTION

I have invented an electrical switch and fuse breaker identification plate having an interchangeable indicia insert member. In the preferred electrical switch embodiment, a rectangular plate has a vertically disposed rectangular-shaped opening formed within the plate in a generally middle portion.

The plate fits over an electrical switch, such as those known as rocker panels, and can be affixed to a wall. Disposed above and below the vertically disposed opening are a pair of horizontally disposed rectangular cavities formed therein. Screw holes are provided within the cavities for affixing the plate to the wall in the standard location for switches. A pair of small bores are formed on opposed sides of each screw hole within each cavity. An indicia marking insert has a shape that is substantially identical to that of the horizontally disposed cavities. Positioned on a bottom side are a pair of pins which insert within the bores formed in the cavities which causes the insert to be retained therein. Indicia is stenciled on a top side of the insert and acts to identify the use of the switch. A small notch is formed along a side wall of the insert for permitting the insert to be "popped" out when desired.

Alternate embodiments for electrical switches can be used with the present invention to accomplish the same desired result. For example, the switch does not need to be a rocker panel style switch, but could be a traditional pole switch, a potentiometer style switch or other known types of switches as well as other wall plate covers for other uses such as cabling applications. Further, alternate embodiments may include plates that are more generally square-shaped for surrounding a pair of switches grouped closely together. Or, a generally square-shaped plate may surround one switch and one outlet (which typically includes a pair of outlets stacked in a vertical position whereby one is disposed over the other).

Yet further, an alternate embodiment for switch plates of the present invention could include a total of three indicia marking inserts so that the switch could be marked for its purpose, for example, a "light" and also include indicia for "on" and "off".

Yet still further, a breaker panel plate could be used to surround a set of breakers located within a breaker panel. In such an embodiment, each breaker could be labeled by attaching the proper identification indicia insert.

Yet still even further, the indicia marking insert could be illuminated, for example, by an LED to permit a person to see the switch or breaker in low light situations. Other known types of illumination can be used, such as, for example, LCD displays and other filament or gas based lighting devices or chemiluminescence based materials.

BRIEF DESCRIPTION OF THE DRAWINGS

The invention may be best understood by those having ordinary skill in the art by reference to the following detailed description when considered in conjunction with the accompanying drawings in which:

FIG. 10 is a fourth alternate embodiment of the electrical switch identification plate of the present invention which is employed with an electrical breaker panel; and FIG. 11 is a side elevational view of a first alternate embodiment of an indicia marking insert employed with the electrical switch identification plate of the present invention which includes a light source for illuminating the indicia marking device when inserted within electrical switch identification plate.

DETAILED DESCRIPTION OF THE INVENTION

Figure 1:
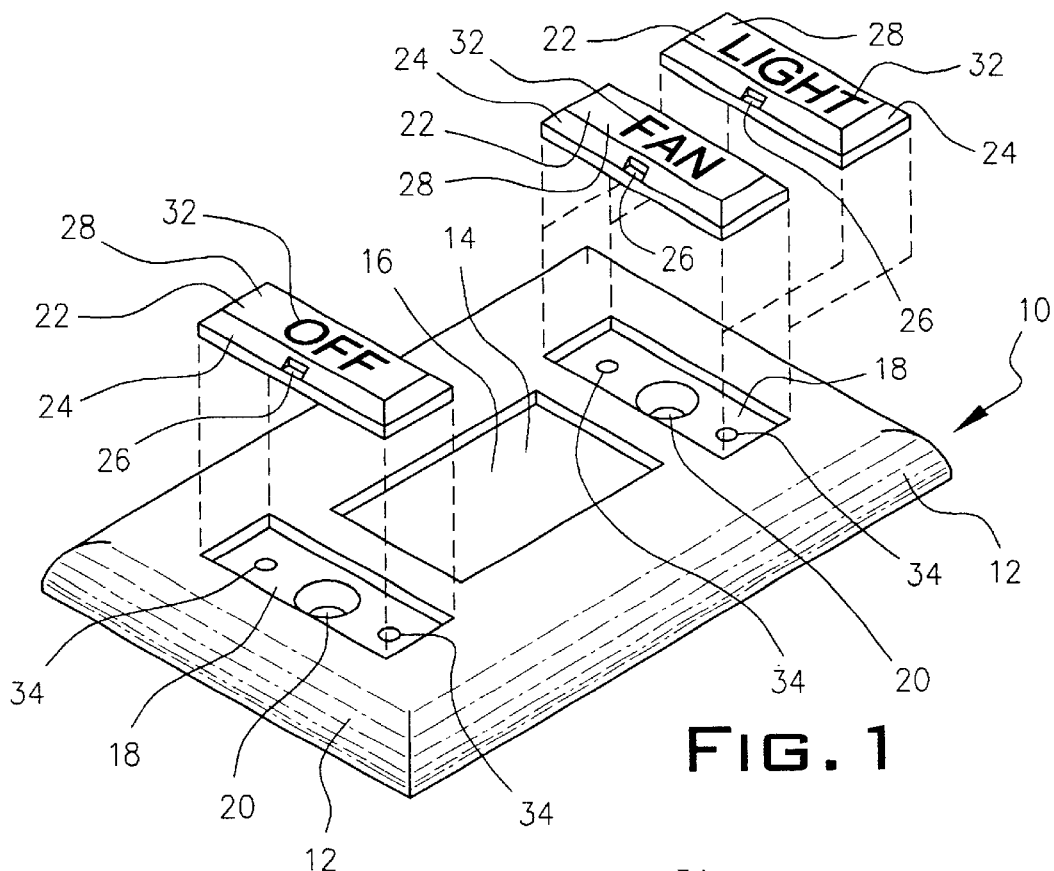
FIG. 1 is a top perspective view of an electrical switch identification plate of the present invention illustrating how indica marking inserts attach to the plate.

Throughout the following detailed description, the same reference numerals refer to the same elements in all figures.

Referring to FIG. 1, an electrical switch identification plate 10 of the present invention is shown. Plate 10 of FIG. 1 represents the preferred embodiment for the subject invention. Plate 10 has a generally rectangular shape with beveled edges 12 surrounding its outer peripheral such that its side edges are longer in length then its top and bottom edge when vertically employed. A rectangular shaped opening 14 is formed in a center section 16 of plate 10 and surrounds a rocker style light switch (not shown). Formed above and below opening 14 are a pair of horizontally disposed rectangular shaped cavities 18. In alternate embodiments, the shape of the cavity and inserts can be, but are not limited to, oval, circular, square and other known shapes. Each cavity 18 is provided with screw hole 20 formed through at a center portion for mounting plate 10 to a wall. The position of each screw hole 20 is placed such that plate 10 can be used with any standard rocker style switch attached to an electrical scheme.

With continuing reference to FIG. 1, it is shown indicia marking inserts 22 can be inserted into cavities 18. Inserts 22 have a generally rectangular shape that correspond to the shape of cavities 18. Inserts 22 have beveled edges 24 which surround at outer peripheral of each insert 22. A small notch 26 is formed along a bottom edge of each insert for permitting the insert to be "popped" out of plate 10 when desired by the use of a small flat bladed screw driver, for example. Formed on opposed sides of each screw hole 20 are bores 34 for receiving reciprocal pins 36 (see FIG. 2) positioned along insert bottom side 30.

Figure 2:
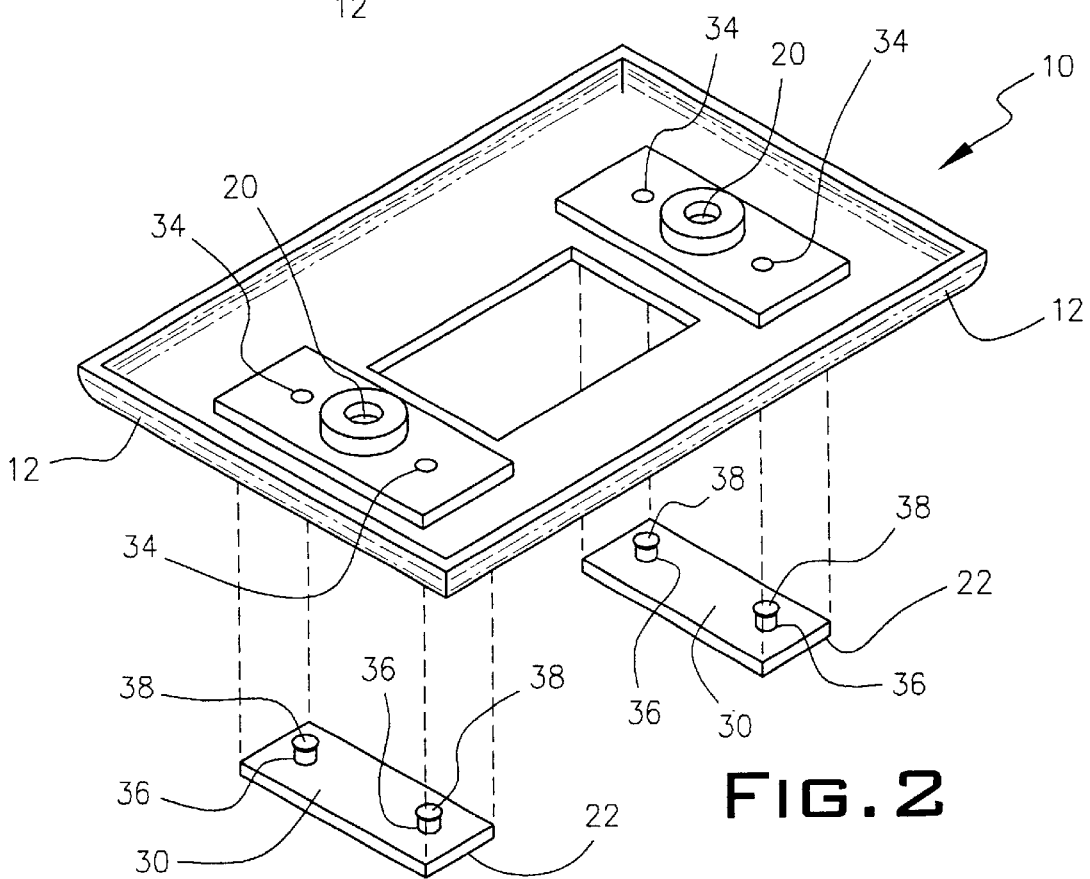
FIG. 2 is a bottom perspective view of the electrical switch identification plate illustrating how the indica marking inserts attach to the plate.
Figure 3:
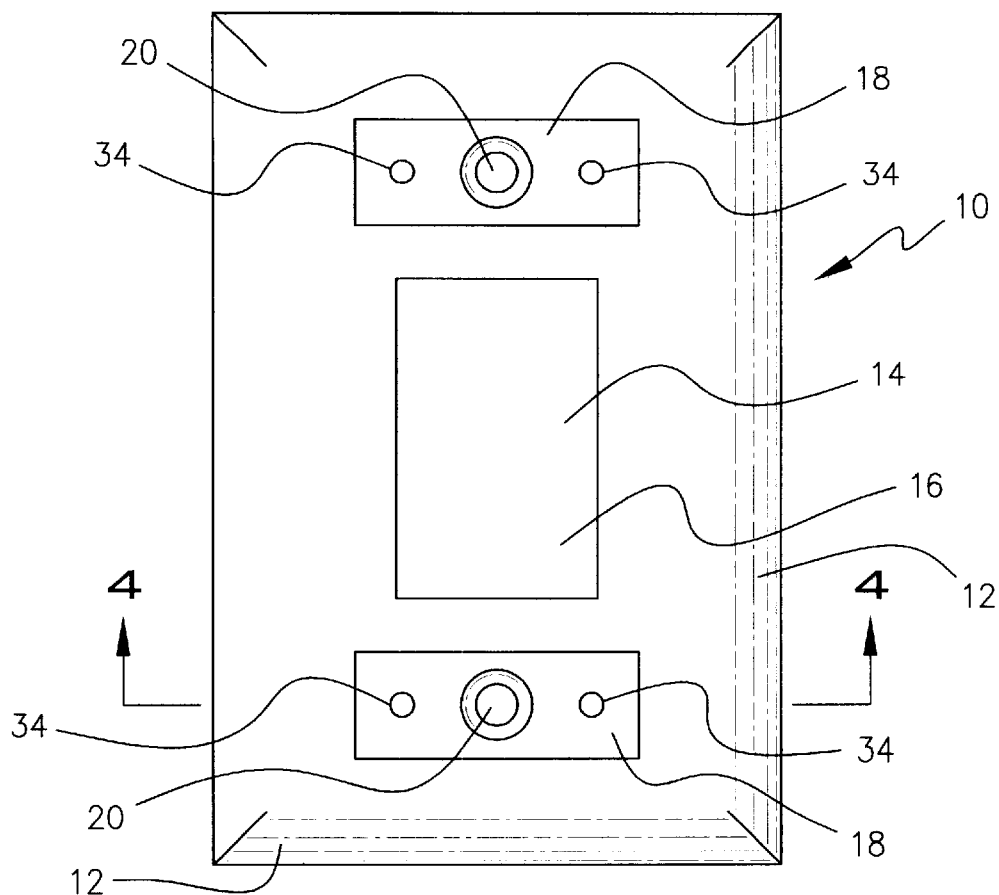
FIG. 3 is a top side elevational view of the electrical switch identification plate of the present invention having no indicia marking inserts inserted therein.
Figure 4:
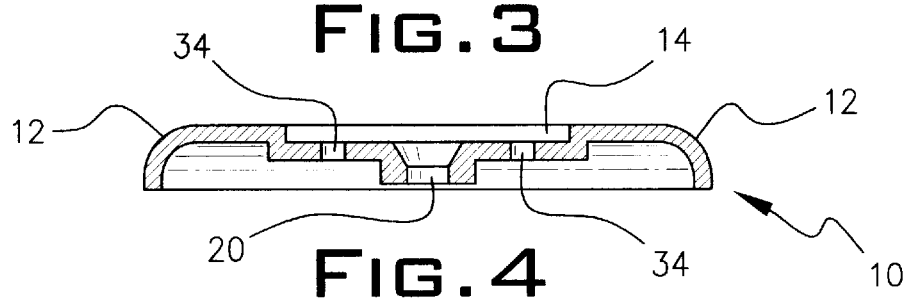
FIG. 4 is a cross-sectional view of the electrical switch plate along lines 4—4 of FIG. 3.

Each insert has a top side 28 (see FIG. 1) and the bottom side 30 (see FIG. 2). Indicia 32 can be stenciled, or affixed in a bevy of different manners, upon insert top side 28 depending on what the user wants to identify. Although not fully illustrative, examples include the words light, kitchen, living room, disposal, hall, outside, bedroom, game room, family room, porch, garage, laundry, stairs, chandelier, TV, stereo, computer, lamp, closet, fan, fan light, bathroom, den, desk light, phone, on, and off. Although not shown, these words could also be substituted for words marked using brail for those who are visually impaired.

Figure 5:
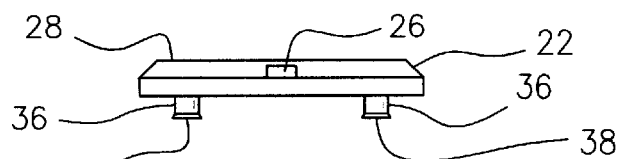
FIG. 5 is a side elevational view of an indicia marking insert employed with the electrical switch identification plate.
Figure 6:
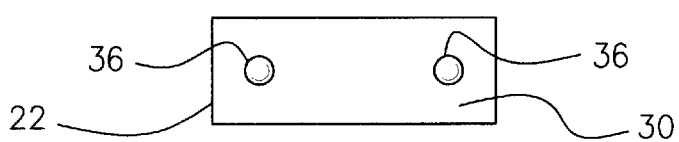
FIG. 6 is a bottom plan view of a preferred indicia marking insert employed with the electrical switch identification plate.

Referring to FIG. 2, it is shown that pins 36 are positioned at a perpendicular angle to insert bottom side 30 and insert within bores 34 thereby retaining insert 22 within cavity 18 by a friction fit. As shown in FIG. 5, pins 36 of insert 22 include a flange member 38 along a tip portion 40 thereby assisting in retaining insert 22 within cavity 18. In an alternate embodiment, pins 36 are not employed and insert 22 is retained in cavity 18 by friction along its peripheral edges.

Although FIGS. 1–3, and 7–9 all illustrate plates used with the subject invention with an opening 14 which accommodates a rocker style switch, nothing herein limits the use of the subject invention with a pole style switch. In such embodiments, which are not shown in the figures, the opening is significantly smaller to accommodate the pole switch.

Figure 7:
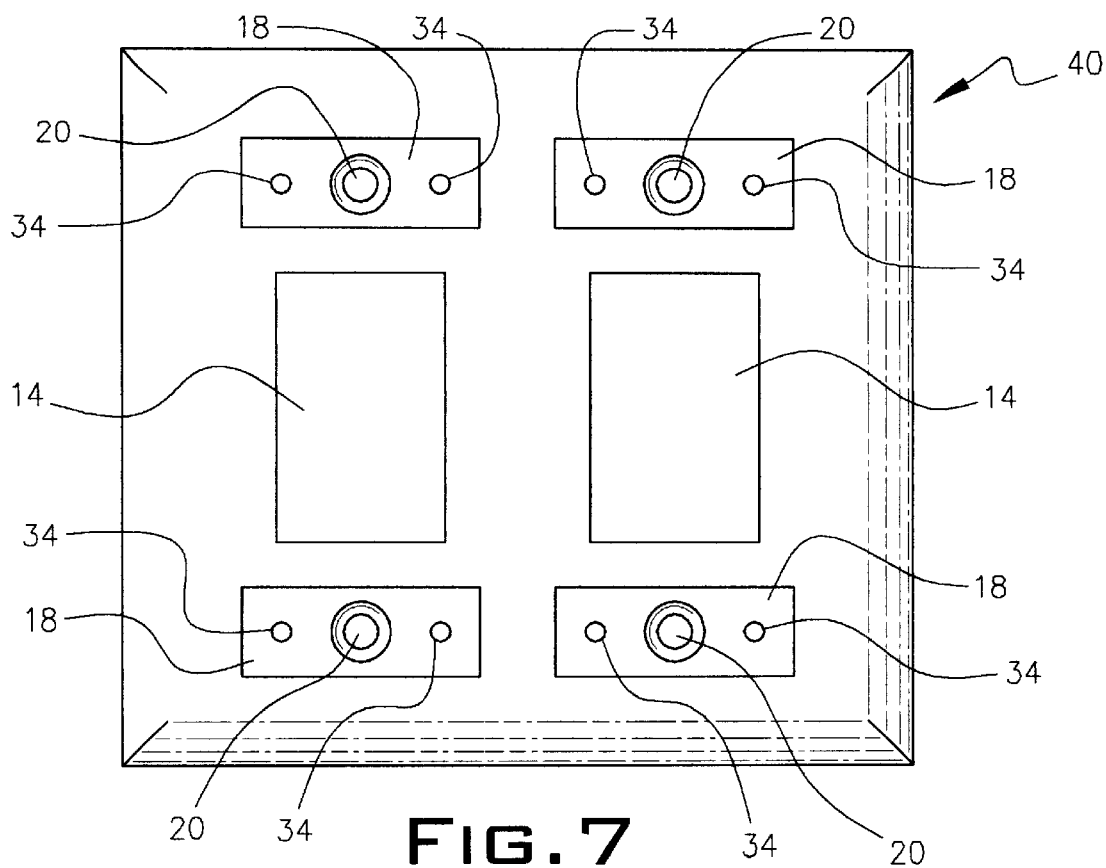
FIG. 7 is a top elevational view of a first alternate embodiment of the electrical switch identification plate of the present invention having no indicia marking inserts inserted therein.
Figure 8:
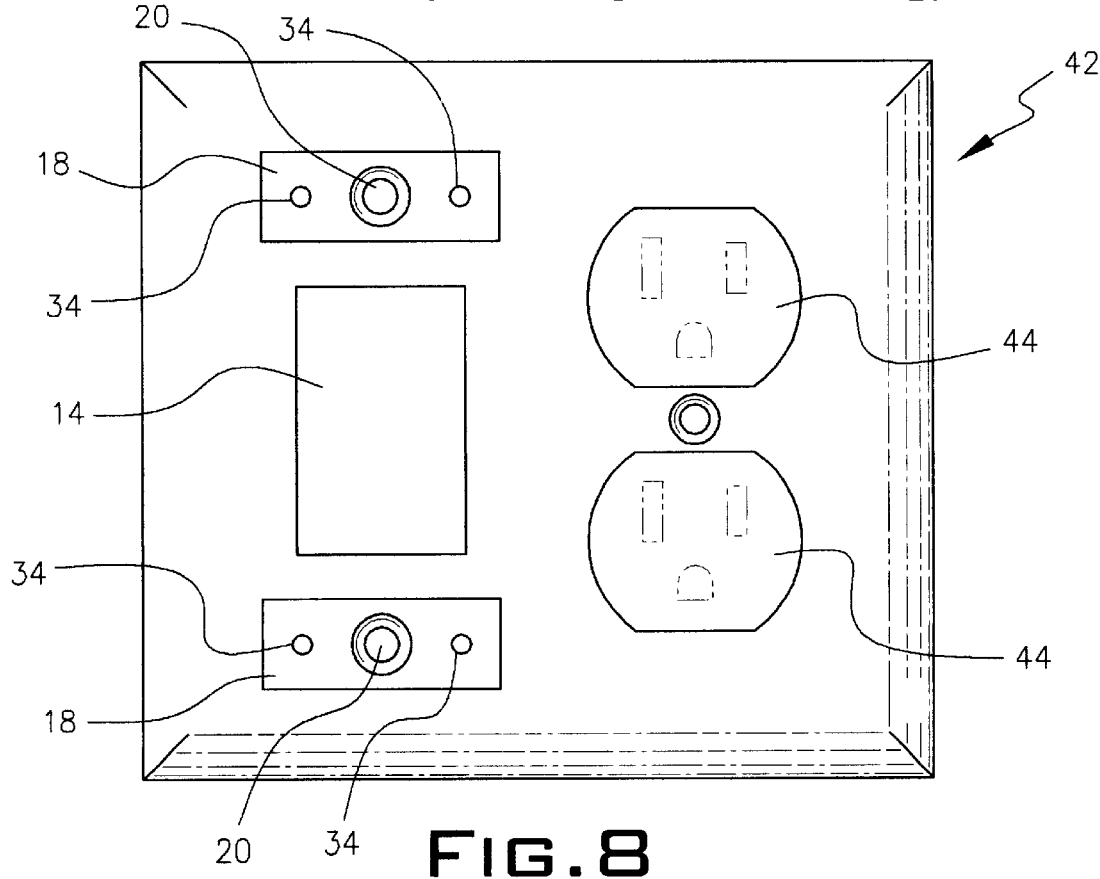
FIG. 8 is a top elevational view of a second alternate embodiment of the electrical switch identification plate of the present invention having no indicia marking inserts inserted therein.

Referring to FIGS. 7–10, alternate embodiments of the present invention are shown. FIG. 7 illustrates a first alternate electrical switch plate 40 wherein a pair of openings 14 are employed to surround a pair of switches grouped in close proximity to one another. FIG. 8 illustrates a second alternate electrical switch plate 42 wherein a single opening 14 is employed for surrounding a single switch mounted in close proximity to an AC outlet. Accordingly, second alternate plate 42 employs a pair of AC outlet openings 44 formed in plate 42 in a parallel relationship to opening 14.

Of course, nothing herein limits other combinations of openings 14 and AC outlet openings 44, such as, for example, a pair of openings 14 and one set of AC outlet openings.

Figure 9:
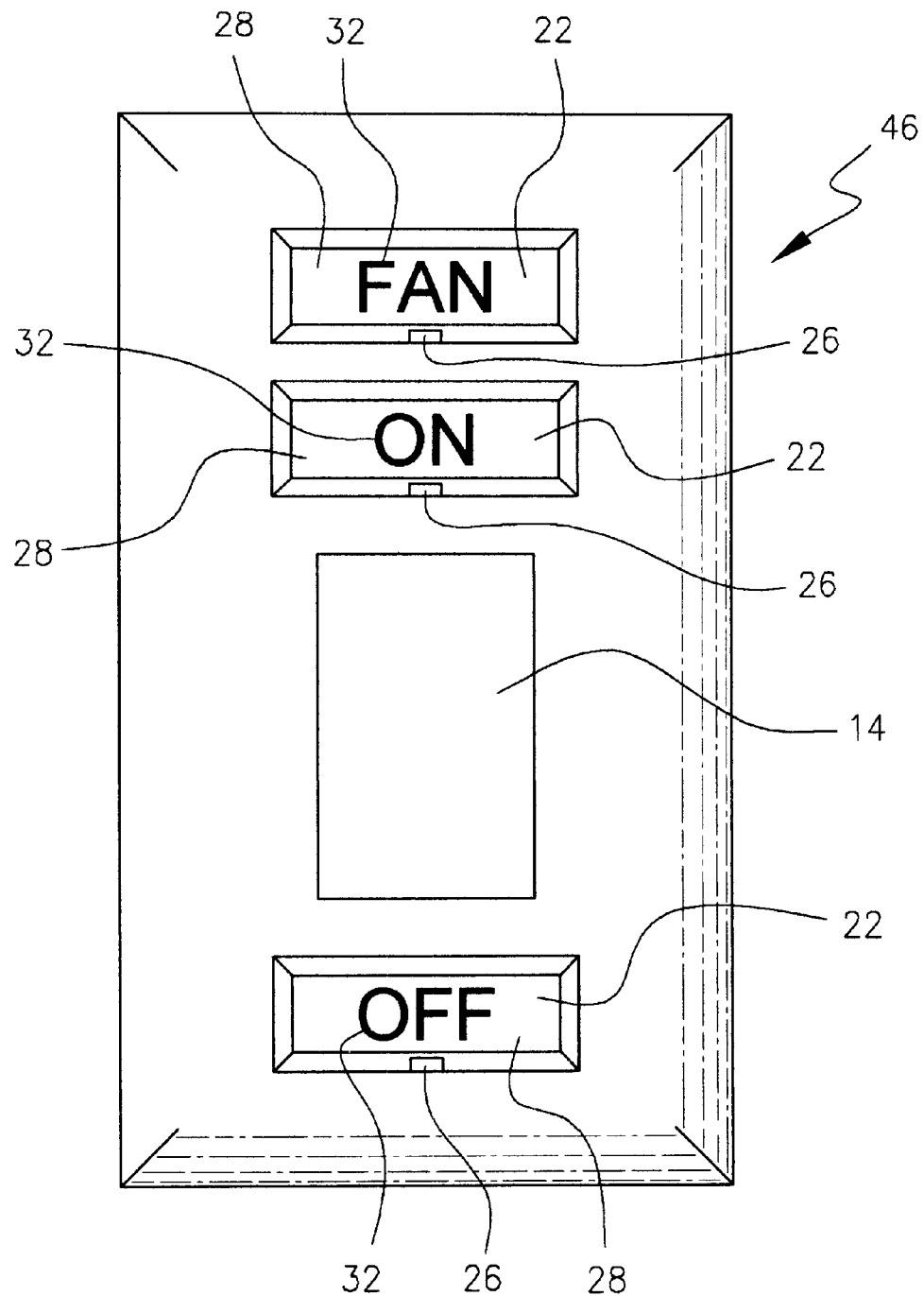
FIG. 9 is a top elevational view of a third alternate embodiment of the electrical switch identification plate of the present invention having indicia marking inserts inserted therein.

Referring to FIG. 9, a third alternate electrical switch plate 46 is shown wherein, disposed above opening 14, are a pair of cavities 18 (not shown) for receiving and retaining a pair of inserts 22. This is in addition to the insert 22 inserted below opening 14. As illustrated, although not limited herein in any manner by FIG. 9, third alternate plate can include an identifying insert 22 for the switch purpose (i.e., a fan), as well as indicating which position is the "on" position and which position is the "off" position.

Referring to FIG. 10, a fourth alternate embodiment is shown. In particular, a breaker panel plate 48 is employed over a breaker panel box 50. Each breaker 52 can then be identified by utilizing inserts 22 in the same manner as the preferred and other alternate embodiments described hereinabove.

Referring to FIG. 11, an alternate insert 54 is shown wherein an LED 56 is employed for illuminating insert 54. LED 56 receives its power from the AC electrical lines of the electrical power scheme of the building in which the plate and insert 54 is employed.

Although not shown, additional alternate embodiments for the subject invention can be provided. For instance, plates which identify computer network related devices and connection devices can be employed. More particularly, a plate could identify a computer work station network connection (i.e., comp1, comp2, comp3, etc . . . ). Further, an intranet or internet connection location could be identified (i.e., DSL, cable, satellite, phone, CAT5, etc . . . ).

Equivalent elements can be substituted for the ones set forth above such that they perform the same function in the same way for achieving the same result.

Having thus described the invention what is claimed and desired to be secured by Letters Patent is:

1. An identification plate mounted to a substrate comprising:
   a) the plate having a generally flat shape, a top and bottom surface and at least one opening formed therein,
   b) at least two cavities formed in the plate and disposed proximal to the at least one opening,
   c) at least one screw hole formed through the plate for receiving at least one screw and attaching the plate to the substrate,
   d) a pair of bores formed in each cavity,
   e) at least two removable indicia insert members, each having a top and bottom surface and a pair of pins inserting into the pair of bores formed in each cavity, each pair of pins attached to each insert member bottom surface at a perpendicular angle thereto, and
   f) indicia mounted on the top surface of each removable indicia insert member.

2. The identification plate of claim 1, wherein one opening and two cavities are employed, a first cavity disposed above the opening and a second cavity disposed below the opening.

3. The identification plate of claim 2, wherein a pair of screw holes are employed, one each formed through each cavity.

4. The identification plate of claim 1, wherein the plate has four beveled edges.

5. The identification plate of claim 2, wherein the plate is generally rectangular shaped.

6. The identification plate of claim 5, wherein the one opening is formed in the plate at a center portion thereof, the one opening having a generally rectangular shape and is disposed in a vertical position such that vertical side edges of the one opening are longer in length than top and bottom edges of the one opening.

7. The identification plate of claim 1, wherein the plate is generally square shaped.

8. The identification plate of claim 7, wherein a pair of openings are employed, each opening having a generally rectangular shape and disposed in a vertical position such that vertical side edges of each opening are longer in length than respective top and bottom edges thereof, the pair of openings juxtaposed in a parallel spaced relationship to one another.

9. The identification plate of claim 8, wherein two pair of cavities are employed, a first pair of cavities formed above and below a first of the pair openings and a second pair of cavities formed above and below a second of the pair of openings.

10. The identification plate of claim 9, wherein two pair of removable indicia insert members are employed, a first pair of insert members inserted within the first pair of cavities and a second pair of insert members inserted within the second pair of cavities.

11. The identification plate of claim 7, wherein a generally rectangular shaped opening is formed in the plate disposed in a vertical position such that vertical side edges of the generally rectangular shaped opening are longer in length than top and bottom edges thereof, and a pair of generally circular openings are formed in the plate such that a first circular opening is disposed above a second circular opening, the first and second circular openings surrounding a pair of electrical sockets mounted within the substrate, the generally rectangular shaped opening positioned juxtaposed the pair of generally circular shaped openings in a parallel spaced relationship.

12. The identification plate of claim 1, wherein a light means is mounted to each removable indicia insert member on the bottom surface thereof, each insert member being translucent for permitting the light means to illuminate the indicia mounted upon the top surface, the light means coupled to an electrical circuit mounted within the substrate.

13. The identification plate of claim 1, wherein the at least one opening surrounds an electrical switch.

14. The identification plate of claim 1, wherein a plurality of openings are formed in the plate in two columns.

15. The identification plate of claim 14, wherein a plurality of cavities are employed, one each for each opening formed in the plate.

16. The identification plate of claim 15, wherein each opening surrounds an electrical breaker switch.

17. An electrical switch identification plate mounted to a wall comprising:
   a) the plate having a generally flat shape, a top and bottom surface and at least one opening formed therein,
   b) at least two cavities formed in the plate and disposed above and below the at least one opening,
   c) at least one screw hole formed through the plate for receiving at least one screw and attaching the switch plate to the wall,
   d) a pair of bores formed in each cavity,
   e) at least two removable indicia insert members, each having a top and bottom surface and a pair of pins inserting into the pair of bores formed in each cavity, each pair of pins attached to each insert member bottom surface at a perpendicular angle thereto, and
   f) indicia mounted on the top surface of each removable indicia insert member.

18. The identification plate of claim 17, wherein one opening and two cavities are employed, a first cavity disposed above the opening and a second cavity disposed below the opening.

19. The identification plate of claim 17, wherein a pair of openings are employed, each opening having a generally rectangular shape and disposed in a vertical position such that vertical side edges of each opening are longer in length than respective top and bottom edges thereof, the pair of openings juxtaposed in a parallel spaced relationship to one another.

20. The identification plate of claim 17, wherein a generally rectangular shaped opening is formed in the plate disposed in a vertical position such that vertical side edges of the generally rectangular shaped opening are longer in length than top and bottom edges thereof, and a pair of generally circular openings are formed in the plate such that a first circular opening is disposed above a second circular opening, the first and second circular openings surrounding a pair of electrical sockets mounted within the wall, the generally rectangular shaped opening positioned juxtaposed the pair of generally circular shaped openings in a parallel spaced relationship.

* * * * *